United States Patent
Dunstan et al.

[11] Patent Number: 5,964,879
[45] Date of Patent: *Oct. 12, 1999

[54] METHOD AND SYSTEM FOR DYNAMICALLY POWER BUDGETING WITH DEVICE SPECIFIC CHARACTERIZATION OF POWER CONSUMPTION USING DEVICE DRIVER PROGRAMS

[75] Inventors: Robert A. Dunstan, Beaverton; Kelan Silvester, Portland, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/974,705

[22] Filed: Nov. 19, 1997

Related U.S. Application Data

[63] Continuation of application No. 08/361,944, Dec. 22, 1994, abandoned.

[51] Int. Cl.$^6$ .................................... G06F 1/26
[52] U.S. Cl. ..................... 713/340; 713/330; 713/320
[58] Field of Search ................ 395/750.03, 750.06, 395/750.08, 750.07; 364/707

[56] References Cited

U.S. PATENT DOCUMENTS

| | | |
|---|---|---|
| 3,602,703 | 8/1971 | Polenz . |
| 3,800,198 | 3/1974 | Graf et al. . |
| 4,146,923 | 3/1979 | Borkan . |
| 4,167,786 | 9/1979 | Miller et al. . |
| 4,253,151 | 2/1981 | Bouve . |
| 4,312,035 | 1/1982 | Greene . |
| 4,324,987 | 4/1982 | Sullivan, II et al. . |
| 4,401,894 | 8/1983 | Weisner . |
| 4,514,142 | 4/1985 | Young . |
| 4,564,767 | 1/1986 | Charych . |
| 4,607,330 | 8/1986 | McMurray et al. . |
| 4,611,289 | 9/1986 | Coppola . |
| 4,677,566 | 6/1987 | Whittaker et al. . |
| 4,747,041 | 5/1988 | Engel et al. . |
| 4,809,163 | 2/1989 | Hirosawa et al. . |
| 4,860,185 | 8/1989 | Brewer et al. . |
| 5,015,826 | 5/1991 | Curti . |
| 5,151,907 | 9/1992 | Robbins . |
| 5,157,711 | 10/1992 | Shimanuki . |
| 5,167,024 | 11/1992 | Smith et al. . |
| 5,283,905 | 2/1994 | Saadeh et al. . |
| 5,287,525 | 2/1994 | Lum et al. . |
| 5,293,632 | 3/1994 | Novakovich et al. . |
| 5,300,874 | 4/1994 | Shimamoto et al. . |
| 5,332,927 | 7/1994 | Paul et al. . |
| 5,339,445 | 8/1994 | Gasztonyi ............................ 395/750 |
| 5,341,503 | 8/1994 | Gladstein et al. . |

(List continued on next page.)

FOREIGN PATENT DOCUMENTS

WO 94/16378  7/1994  WIPO .

OTHER PUBLICATIONS

European Search Report EP 95 94 3814, Apr. 1, 1998.
R. Young, et al., "Adaptive CLock Speed Control for Variable Processor Loading", Motorola Inc., vol. 15, May 1992, 1 pg.
"Power Management", N. Licausi, IBM Technical Disclosure Bulletin, vol. 16, No. 7 Dec. 1973, p. 2429.

*Primary Examiner*—Ayaz R. Sheikh
*Assistant Examiner*—Raymond N. Phan
*Attorney, Agent, or Firm*—Blakely, Sokoloff, Taylor & Zafman

[57] ABSTRACT

A computer system that provides device specific power characterizations for power control and budgeting functions is disclosed. The device driver programs of the computer system or a power characterizer of the system determines device specific power characterizations for corresponding devices under device specific controlled conditions. The device specific power characterizations are stored in persistent storage for subsequent use by power control and budgeting functions.

22 Claims, 8 Drawing Sheets

U.S. PATENT DOCUMENTS

| | | | |
|---|---|---|---|
| 5,355,490 | 10/1994 | Kou | 395/700 |
| 5,396,635 | 3/1995 | Fung | 395/800 |
| 5,410,713 | 4/1995 | White et al. | 395/750 |
| 5,423,045 | 6/1995 | Kannan et al. | 395/750 |
| 5,428,790 | 6/1995 | Harper et al. | 395/750 |
| 5,450,007 | 9/1995 | Payne et al. | 324/141 |
| 5,483,656 | 1/1996 | Oprescu et al. | 395/750 |
| 5,511,205 | 4/1996 | Kannan et al. | 395/750 |
| 5,513,359 | 4/1996 | Clark et al. | 395/750 |
| 5,530,878 | 6/1996 | Bauer et al. | 395/750 |
| 5,530,879 | 6/1996 | Crump et al. | 395/750 |
| 5,532,945 | 7/1996 | Robinson | 364/707 |
| 5,535,401 | 7/1996 | Rawson, III et al. | 395/750 |
| 5,560,023 | 9/1996 | Crump et al. | 395/750 |
| 5,752,046 | 5/1998 | Oprescue et al. | 395/750.01 |
| 5,768,147 | 6/1998 | Young | 364/528.21 |
| 5,894,579 | 4/1999 | Fujihara | 713/324 |

METHOD AND SYSTEM FOR DYNAMICALLY POWER BUDGETING WITH DEVICE SPECIFIC CHARACTERIZATION OF POWER CONSUMPTION USING DEVICE DRIVER PROGRAMS

This is a continuation of application Ser. No. 08/361,944, filed Dec. 22, 1994, now abandoned.

BACKGROUND OF THE INVENTION

1. Field of the Invention

The present invention pertains to the field of computer systems. More particularly, this invention relates to computer system power management with device specific characterization of power consumption.

2. Background

Computer systems such as portable computer systems, desktop computer systems, and server systems typically include a power supply subsystem. Such a power supply subsystem supplies electrical current to the components and devices of the computer system. For example, portable or notebook computer systems typically include a battery subsystem that supplies direct current (DC) to devices and components. In addition, desktop or server systems typically include a power supply that converts an alternating current (AC) power source into DC for the devices and components of the computer system.

Typically, such power supplies impose limits on the amount of electrical current available to the computer system. For example, a battery subsystem for a typical prior notebook computer usually provides a limited level of peak electrical current for a limited duration before battery replacement or recharging is required. In addition, the AC power supply in prior desktop or server systems typically imposes an upper limit on the amount of peak electrical current available to the computer system.

Such limits on the availability of electrical current typically imposes a variety of constraints on the operations of computer systems. For example, a desktop or server system having multiple rotating media mass storage devices such as disk drives may exceed the capacity of the power supply under some conditions. Such disk drives usually draw maximum electrical current during startup while the disk platter spins up to the appropriate angular speed. The peak electrical current draw in such a system may exceed the capacity of the AC power supply if multiple disk drives startup concurrently. Such strains on an AC power supply typically causes the power supply voltage level to drop below normal operating levels. Such low voltage levels may cause hardware errors and erroneous system resets. Similarly, excess electrical current draws on the battery supply in a notebook computer system may cause lowered voltage levels and lead to hardware errors and erroneous system resets.

Some prior desktop or server systems implement an over-designed power supply capable of supplying the peak electrical current required to spin up multiple diskdrives concurrently even though normal system operation does not require such peak current levels. Unfortunately, such high capacity power supplies typically increase the cost of such desktop or server systems. In addition, such high capacity power supplies are typically less efficient over a wide range of electrical supply current in comparison to lower capacity power supplies.

Other prior computer systems implement power management mechanisms that attempt to control the amount of electrical current drawn from the power supply. For example, a prior desktop or server system may provide a controlled startup sequence for the disk drives that prevents the system from exceeding the maximum electrical current capability of the AC power supply. In addition, prior power management mechanisms for notebook computers typically switch off the display screen backlight during a startup phase of a disk drive or during some other activity that requires a large electrical current draw from the battery power supply.

Such prior power management schemes usually rely on hard coded values for the electrical current requirements of the computer system. Such hard coded characterizations of power consumption are typically based upon average current consumption measurements obtained during manufacture. Unfortunately, such hard coded values typically provide inaccurate characterizations because the actual electrical current draw of any given device or combination of devices usually varies from such average values. Such inaccurate device power characterizations can lead to excessive current draws on a power supply, and thereby create the low-voltage levels that cause hardware errors and erroneous system resets.

In addition, prior power management mechanisms for notebook computers typically rely on hard coded values for the electrical current requirements of the system. Unfortunately, such hard coded characterizations of power consumption may cause such a system to switch off the display screen backlight during disk drive startup even though the actual disk drive installed in the notebook consumes less electrical current during spin up than the originally specified the disk drive for the system. Unnecessary power management actions such as switching off the screen display backlight creates unnecessary annoyances for the computer user and unnecessary interruptions in other system functions.

SUMMARY OF THE INVENTION

The present invention is a computer system that provides device specific power characterizations for power control and budgeting functions. The computer system includes a set of devices and corresponding device driver programs. The device driver programs determine a device specific power characterization for corresponding devices including startup and steady state power consumption indications by measuring the power draw on the computer system power supply under device specific controlled conditions. The device specific power characterizations are stored in a persistent storage for subsequent use by power control and budgeting functions in the computer system.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
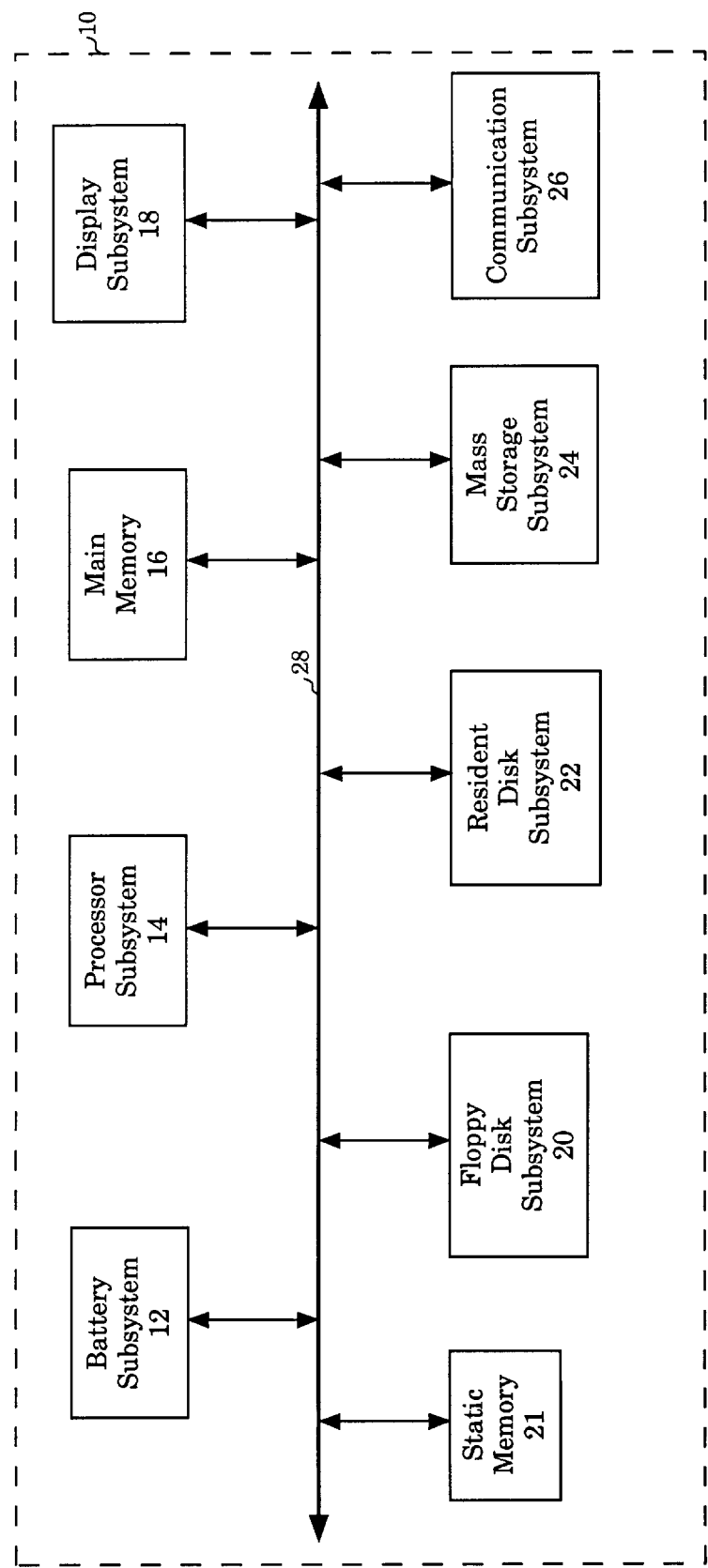
FIG. 1 illustrates a computer system for one embodiment which comprises a processor subsystem, a main memory, a display subsystem, a static memory, a floppy disk subsystem, a resident disk subsystem, a mass storage subsystem, and a communication subsystem.

FIG. 1 illustrates a computer system 10 for one embodiment. The computer system 10 comprises a processor subsystem 14, a main memory 16, and display subsystem 18, and a static memory 21. The computer system 10 further comprises a floppy disk subsystem 20, a resident disk subsystem 22, a mass storage subsystem 24, and a communication subsystem 26.

The processor subsystem 14 communicates with the main memory 16, the display subsystem 18, the floppy disk subsystem 20, the static memory 21, the resident disk subsystem 22, the mass storage subsystem 24, and the communication subsystem 26 communicate via a system bus 28.

The main memory 16 provides storage areas for an operating system, a set of application programs and a set of associated device driver programs and data structures implemented on the computer system 10.

The static memory 21 provides storage areas for a set of basic input/output software (BIOS) or a hardware abstraction layer (HAL) for the computer system 10. For one embodiment, static memory 21 comprises a static random access memory with battery power back-up. For other embodiments static memory 21 comprises flash memory or other forms of non-volatile memory.

The display subsystem 18 provides a display area that enables user interface functions for the computer system 10. The display subsystem 18 also provides software controllable intensity levels and backlighting functions. The amount of electrical current consumption of the display subsystem 18 varies according to the display intensity and the level of backlighting intensity.

The resident disk subsystem 22 is a rotating media mass storage device. The electrical power consumption of the resident disk subsystem 22 varies according to a set of operating phases. For one embodiment, the operating phases of the resident disk subsystem 22 comprise a startup phase, a steady state phase, and a power off phase. The power consumption of the steady state phase varies according to the programmed values in a set of inactivity timers for the resident disk subsystem 22. The inactivity timers determine the conditions for entering sleep states and other power states of the resident disk subsystem 22.

The computer system 10 further comprises a removable mass storage subsystem 24 and a removable communication subsystem 26. The mass storage subsystem 24 and the communication subsystem 26 may be routinely inserted and removed from the computer system 10 via standardized sockets coupled to the system bus 28. Such standardized sockets may comprise, for example, Personal Computer Memory Card International Association (PCMCIA) slots. The electrical power consumption of the mass storage subsystem 24 and the communication subsystem 26 varies according to the corresponding operating phases. For one embodiment, the communication subsystem 26 comprises a fax modem device. The fax modem device consumes an amount of electrical current that varies according to send or receive or other modem activities, as well as on and off and standby power states of the fax modem device.

For one embodiment, the static memory 21 provides a persistent storage for a power characterization table for the devices of the computer system 10 including the display subsystem 18, the floppy disk subsystem 20, the resident disk subsystem 22, the mass storage subsystem 24, and the communication subsystem 26. For other embodiments, the persistent storage for a power characterization table is provided by the floppy disk subsystem 20, or by the resident disk subsystem 22, or by the mass storage subsystem 24 which may be a flash memory, or is obtained remotely via the communication subsystem 26.

A battery subsystem 12 provides electrical power to the various components and devices of the computer system 10 via a set of electrical power lines that are included with the system bus 28.

Figure 2:
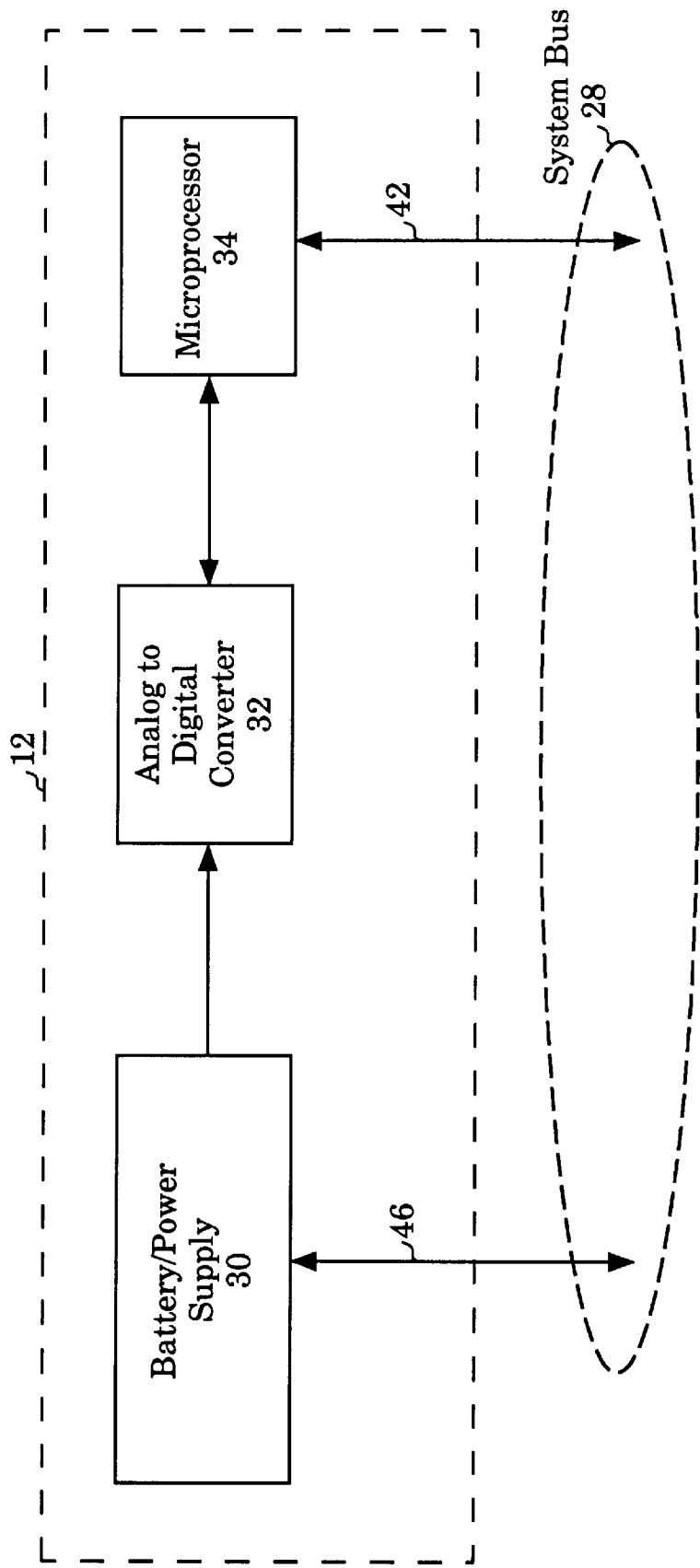
FIG. 2 illustrates a battery subsystem for one embodiment which comprises a battery/power supply, an analog to digital converter, and a microprocessor.

FIG. 2 illustrates the battery subsystem 12 for one embodiment. The battery subsystem 12 comprises a battery/power supply 30, an analog to digital converter 32, and a microprocessor 34.

The battery/power supply 30 provides DC electrical currents via a set of power lines 46 for the computer system 10. The electrical currents supplied by the battery/power supply 30 include a predetermined set of fixed voltage levels required by the devices and components coupled to the system bus 28 and may include 5 volts, 12 volts, and 3.3 volts. or other voltage levels.

The analog to digital converter 32 samples the voltage levels, electrical current levels, and temperature levels generated by the battery/power supply 30. The analog to digital converter 32 converts the sampled analog voltage, current, and temperature signals to digital data under the control of the microprocessor 34.

The microprocessor 34 is programmed with the characteristic curves for the battery in the battery/power supply 30. The microprocessor 34 uses the digitized voltage, current, and temperature levels sensed from the battery/power supply 30 to determine the amounts of electrical power available from the battery subsystem 12.

The processor subsystem 14 communicates with the microprocessor 34 via a set of battery control lines 42. The processor subsystem 14 transfers battery messages to the microprocessor 34 via the battery control lines 42 to query the power levels of the battery/power supply 30. The battery messages may include an at_rate_ok message. The at_rate_ok battery message from the processor subsystem 14 includes an electrical current value. The microprocessor 34 processes the at_rate_ok message by determining whether the specified electrical current level is available from the battery/power supply 30. The microprocessor 34 then transfers a Boolean true or false response message to the processor subsystem 14 via the battery control lines 42 to indicate whether the requested electrical current level is available.

The battery messages from the processor subsystem 14 also may include an at_rate_time_remaining message. The at_rate_time_remaining battery message includes an electrical current value. The microprocessor 34 processes the at_rate_time_remaining message by determining the amount of time that the specified electrical current level is available from the battery/power supply 30. The microprocessor 34 then transfers the indicated time remaining in a message to the processor subsystem 14 via the battery control lines 42.

The battery messages also include messages that enable the processor subsystem 14 to query the amount of electrical current being supplied by the battery/power supply 30. The processor subsystem 14 transfers the battery query messages to the microprocessor 34 in order to sample the electrical current generated by the battery/power supply 30 at any given time.

Figure 3:
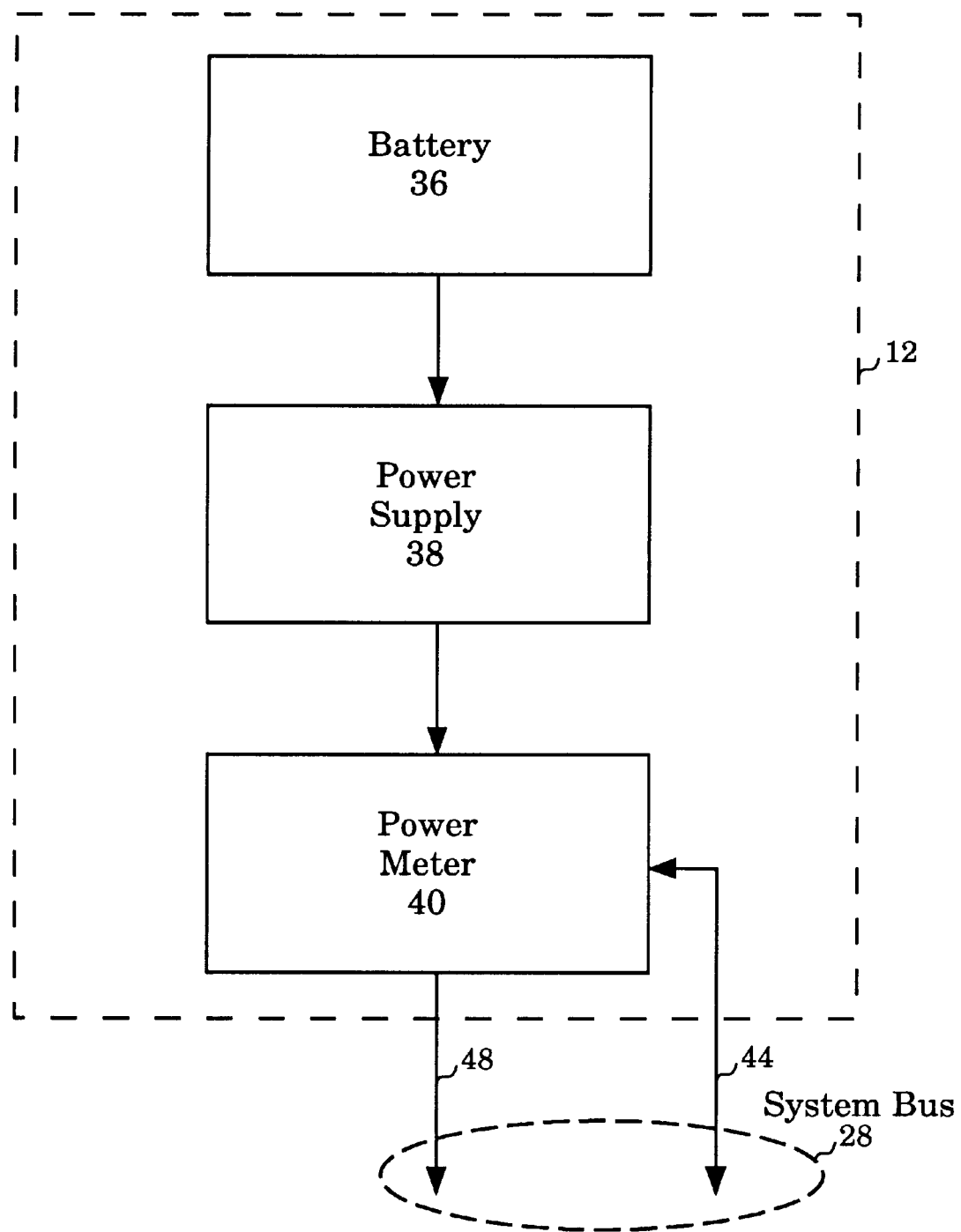
FIG. 3 illustrates a battery subsystem for another embodiment which comprises a battery, a power supply, and a power meter.

FIG. 3 illustrates the battery subsystem 12 for another embodiment which comprises a battery 36, the power supply 38, and a power meter 40. The battery 36 supplies electrical current to the power supply 38. The power supply 38 generates the various electrical currents at the voltage levels required by the components and devices of the computer system 10. The electrical currents are supplied to the computer system 10 via a set of power lines 48.

The power meter 40 measures the electrical current levels generated by the battery 36 and the power supply 38. The processor subsystem 14 reads the electrical current level sensed by the power meter 40 via a set of signal lines 44. The power meter 40 enables the processor subsystem 14 to sample the electrical current levels generated by the battery subsystem 12 at any given time.

Figure 4:
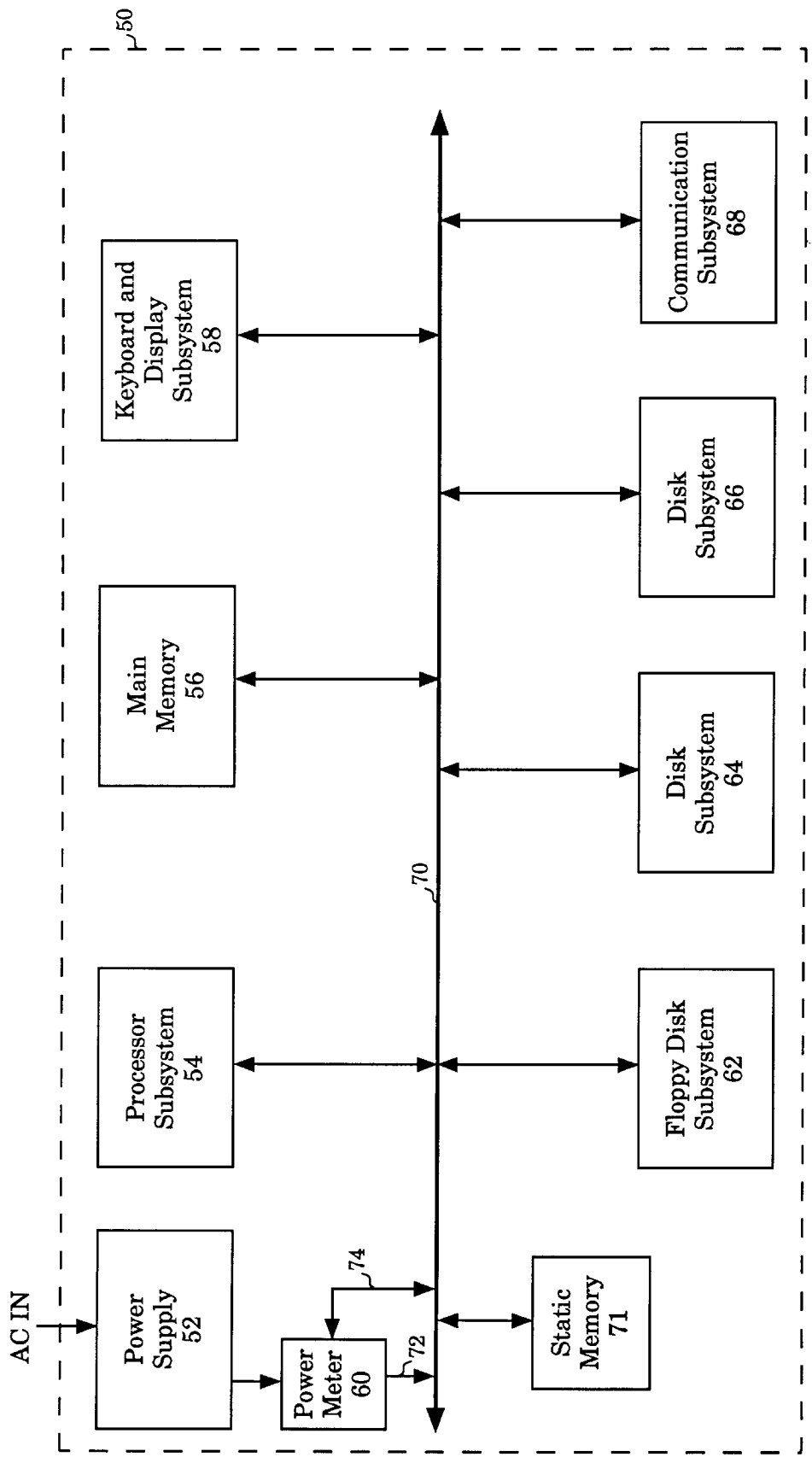
FIG. 4 illustrates a desktop computer or server system for yet another embodiment which comprises a processor subsystem, a main memory, a keyboard and display subsystem, a floppy disk subsystem, a pair of disk subsystems and a communication subsystem.

FIG. 4 illustrates a desktop computer or server system 50 for yet another embodiment. The system 50 comprises a processor subsystem 54, a main memory 56 and a keyboard and display subsystem 58. The system 50 further comprises a floppy disk subsystem 62, a pair of disk subsystems 64 and 66 and a communication subsystem 68.

The processor subsystem 54 communicates with the main memory 56, the keyboard and display subsystem 58, the floppy disk subsystem 62, the disk subsystems 64 and 66, and the communication subsystem 68 via a system bus 70. The main memory 56 provides storage areas for an operating system, a set of application programs and a set of associated device driver programs and data structures implemented on the system 50.

The system 50 further comprises a power supply 52, a power meter 60, and a static memory 71. the power supply 52 receives an alternating current (AC) input and generates direct current (DC) output for the devices and components of the system 50 via a system bus 70. The static memory 71 provides storage areas for a set of basic input/output software (BIOS) as well as a power characterization table for the devices of the system 50. The power meter 60 enables the processor subsystem 54 to read the electrical current levels supplied by the power supply 52 to the system 50. The processor subsystem 54 reads the electrical current levels via a set of signal lines 74 to the power meter 60.

The processor subsystem 54 employs the power meter 60 to measure the amounts of electrical current required by the keyboard and display subsystem 58, the floppy disk subsystem 62, the disk subsystems 64 and 66, and the communication subsystem 68. The processor subsystem 54 measures the electrical current required by each device for the differing operating phases of each device. For example, the processor subsystem 54 uses the power meter 60 to measure the electrical current drawn by the disk subsystem 64 during a startup phase while the disk spins-up, during a steady state phase wherein the disk rotates at a constant angular velocity, and during a power off phase. The processor subsystem 54 stores the electrical current requirements of the devices in an internal power characterization table in a persistent storage such as the static memory 21 or a disk or flash memory subsystem.

Figure 5:
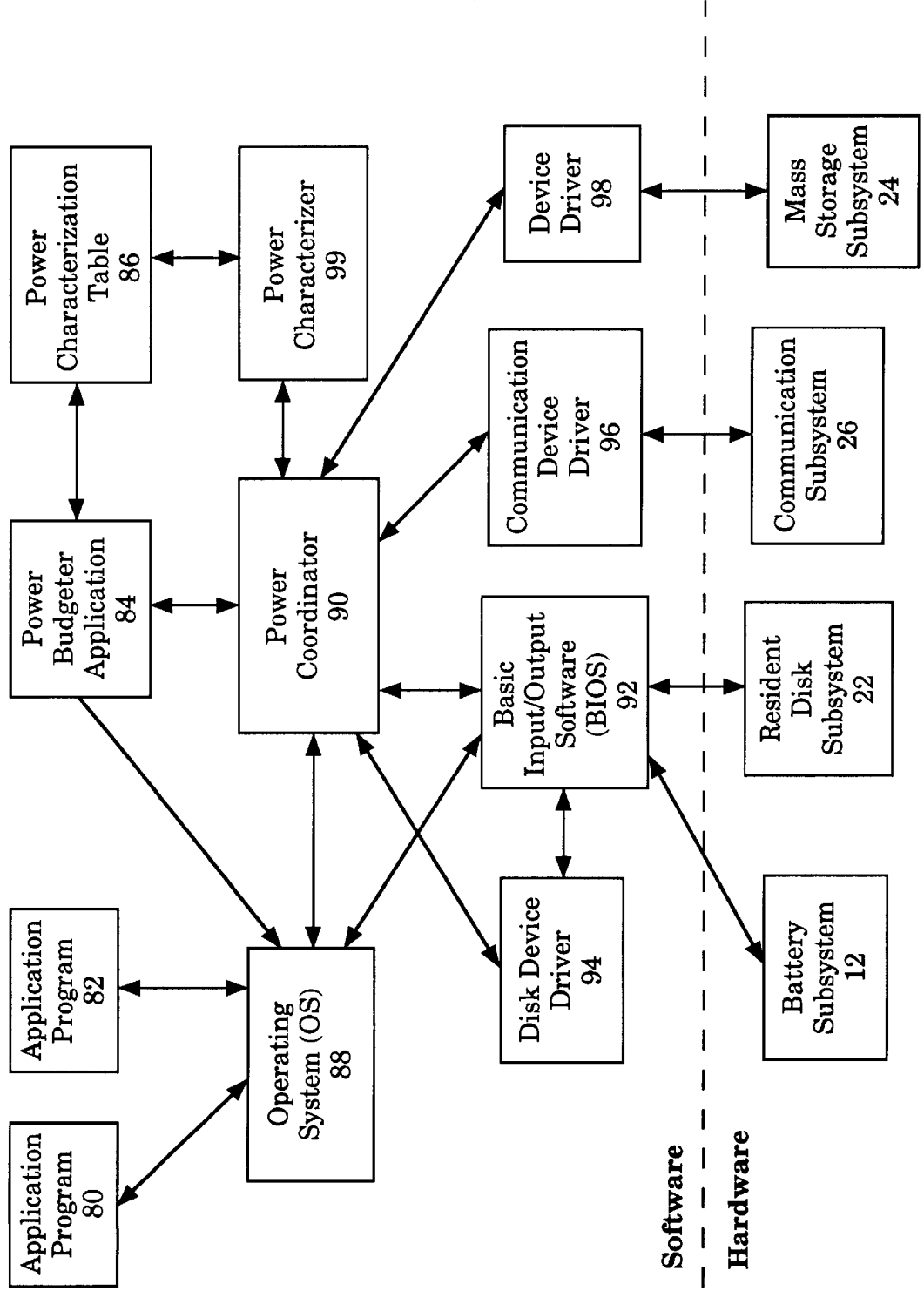
FIG. 5 illustrates the software architecture of a computer system for one embodiment which includes device driver programs that perform device specific power characterizations.

FIG. 5 illustrates the software architecture of the computer system 10 for one embodiment. The software architecture of the computer system 10 comprises application programs including a pair of application programs 80 and 82. The application programs 80 and 82 invoke the system services provided by an operating system (OS) 88. The operating system 88 enables the application programs 80 and 82 to access hardware devices of the computer system 10 via the corresponding device driver programs.

For example, the operating system 88 enables the application programs 80 and 82 to access the resident disk subsystem 22 through a disk device driver 94. For one embodiment, the disk device driver 94 invokes services of a set of basic input/output software (BIOS) 92 to access the resident disk subsystem 22.

The operating system 88 enables the application programs 80 and 82 to access the communication subsystem 26 through a communication device driver 96. The operating system 88 also enables the application programs 80 and 82 to access the mass storage subsystem 24 through the device driver 98 that corresponds to the mass storage subsystem 24.

The software architecture of the computer system 10 further comprises a power coordinator 90 and a power budgeter application 84. The power budgeter application 84 accesses a power characterization table 86 in the static memory 21 that provides a device specific power characterization for each of the devices of the computer system 10 including the resident disk subsystem 22, the communication subsystem 26, and the mass storage subsystem 24. The device power characterizations in the power characterization table 86 indicate the electrical power consumed by the corresponding devices under a set of corresponding operating phases of the devices.

For one embodiment, the BIOS 92 includes a set of battery driver routines. For one embodiment, the battery driver routines in the BIOS 92 enable the transfer of messages to and from the microprocessor 34 via the battery control lines 42. The battery driver routines of the BIOS 92 enable application programs and device driver programs executing on the computer system 10 to transfer battery messages to the battery subsystem 12. The battery driver routines in the BIOS 92 enable application programs and device driver programs to query the electrical current levels being supplied by the battery subsystem 12. The battery driver routines in the BIOS 92 also enable application programs and device driver programs to transfer at_rate_ok and at_rate_time_remaining messages to the battery subsystem 12 and to receive corresponding response messages from the battery subsystem 12. For other embodiments, the battery driver routines are implemented in a hardware abstraction layer or in a separate battery driver.

For an alternative embodiment, the battery driver routines enable read access to the power meter 40. The battery driver routines enable application programs and device driver programs to measure the electrical current levels being supplied by the battery subsystem 12 to the computer system 10.

For one embodiment, the power coordinator 90 enables access to the battery driver routines of the BIOS 92 from the power budgeter application 84, the disk device driver 94, the communication device driver 96 and the device driver 98. For another embodiment, the power budgeter application 84, the disk device driver 94, the communication device driver 96, and the device driver 98 each directly access the battery driver routines of the BIOS 92.

For one embodiment, the device driver programs of the computer system 10 each perform device power characterization functions on the corresponding devices. The disk device driver 94 performs power characterization functions for the resident disk subsystem 22. Similarly, the communication device driver 96 performs device power characterization functions for the communication subsystem 26, and the device driver 98 performs device power characterization functions for the mass storage subsystem 24. For an alternative embodiment, the device power characterization functions are performed for all devices by a power characterizer 99.

The disk device driver 94, the communication device driver 96, and the device driver 98 each transfer the corresponding device power characterizations to the power budgeter application 84 through the power coordinator 90. The power budgeter application 84 stores the device power characterizations in the power characterization table 86.

The power budgeter application 84 receives power allocation requests from application programs and device driver programs through the power coordinator 90. Each power allocation request specifies an operating phase of the corresponding requesting device. For example, the disk device drive issues power allocation requests that specify either the startup phase, the steady state phase, or the power off phase of the resident disk subsystem 22.

In response to a power allocation request, the power budgeter application 84 queries the battery subsystem 12 to determine the amount of electrical power available. For other embodiments in desktop or server systems, a power allocation request causes the power budgeter application 84 to query the system power supply to determine the amount of electrical power available to perform power sequencing functions.

The power budgeter application 84 determines the amount of electrical power required for the specified operating phase of the requesting device by accessing the power characterization table 86. The power budgeter application 84 compares the information logged in the power characterization table 86 with the amount of available power to determine whether the battery subsystem 12 can satisfy the power allocation request.

Figure 6:
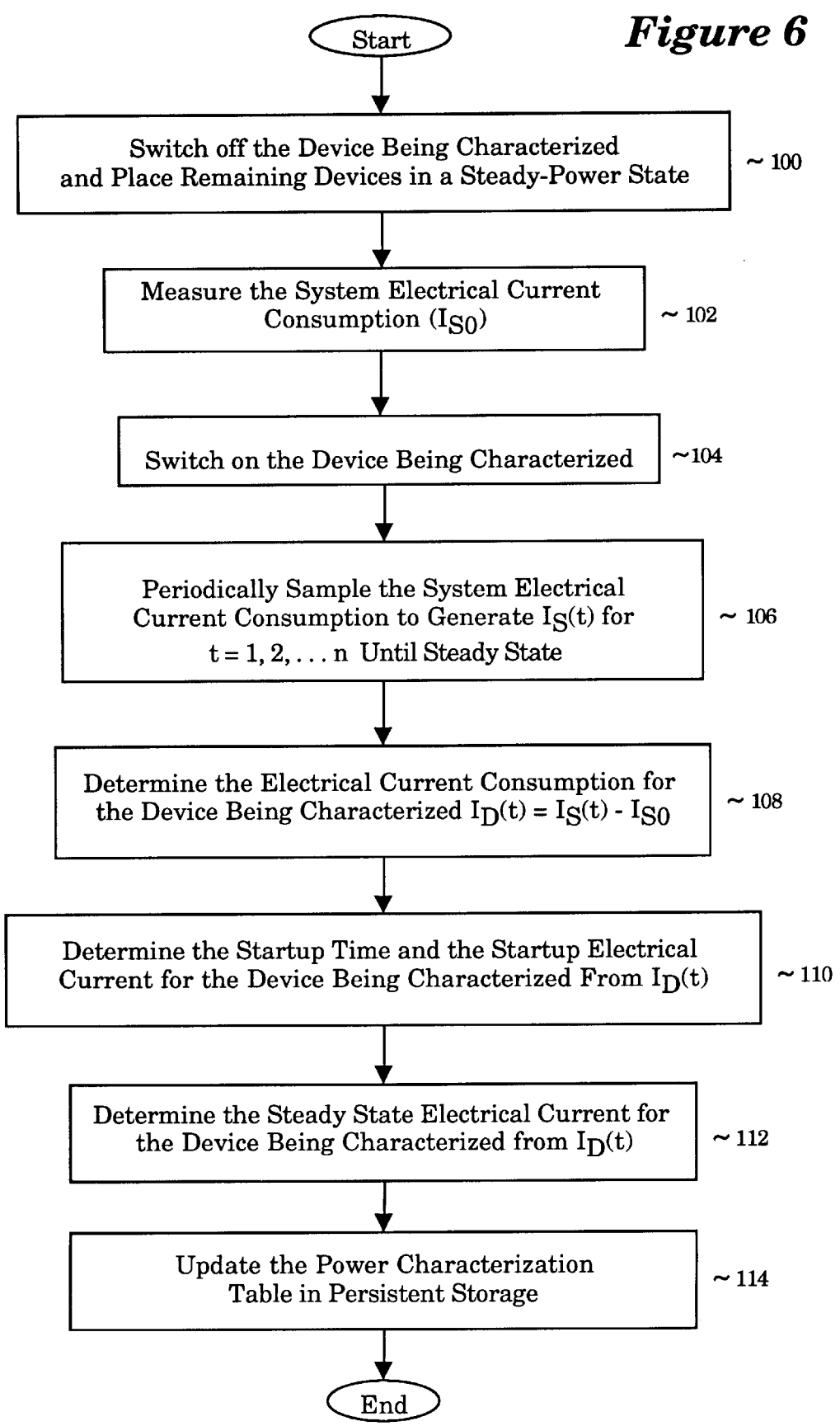
FIG. 6 illustrates a method employed by a device driver to perform power characterization of a corresponding device.

FIG. 6 illustrates a method employed by a device driver to perform power characterization of a corresponding device. For example, the disk device driver 94 employs the process steps shown to perform power characterization for the resident disk subsystem 22.

At block 100, the disk device driver 94 switches off the device being characterized, in this example the resident disk subsystem 22, and places the remaining devices into a steady power state. At block 102, the disk device driver 94 measures the electrical current consumption of the computer system 10 ($I_{S0}$). The disk device driver 94 measures the electrical current consumption of the computer system 10 by measuring the electrical current being drawn from the battery subsystem 12.

For one embodiment, the disk device driver 94 measures the system electrical power consumption by invoking the battery driver routines of the BIOS 92 to transfer battery query messages to the microprocessor 34. The battery driver routines of the BIOS 92 enables the disk device driver 94 to query the microprocessor 34 for the electrical currents being supplied via the power lines 46. For another embodiment, the disk device driver 94 determines system power consumption by reading the power meter 40 via the signal lines 44.

At block 104, the disk device driver 94 switches on the device being characterized, in this example the resident disk subsystem 22. Thereafter at block 106, the disk device driver 94 periodically samples the system electrical current consumption for the computer system 10 until a steady state level of electrical current consumption is reached. The periodic sampling of system power consumption at block 106 yields a set of electrical current values $I_S(t)$ where t represents time.

At block 108, the disk device driver 94 determines the electrical current consumption for the resident disk subsystem 22 according to the following equation:

$$I_D(t)=I_S(t)-I_{S0}.$$

At block 110, the disk device driver 94 determines the startup time and the startup electrical current for the device being characterized. The disk device driver 94 determines the startup time and the startup electrical current for the resident disk subsystem 22 by examining the electrical current consumption $I_D(t)$.

At block 112, the disk device driver 94 determines the steady state electrical current for the device being characterized. The disk device driver 94 determines the steady state electrical current for the resident disk subsystem 22 by examining the electrical current consumption $I_D(t)$.

Thereafter, at block 114 the disk device driver 94 transfers the startup time, the startup electrical current and the steady state electrical current for the device being characterized, in this example the resident disk subsystem 22, to the power budgeter application 84 through the power coordinator 90. The power budgeter application 84 then stores the power characterization including the startup time, the startup electrical current and the steady state electrical current for the resident disk subsystem 22 into the power characterization table 86.

Figure 7:
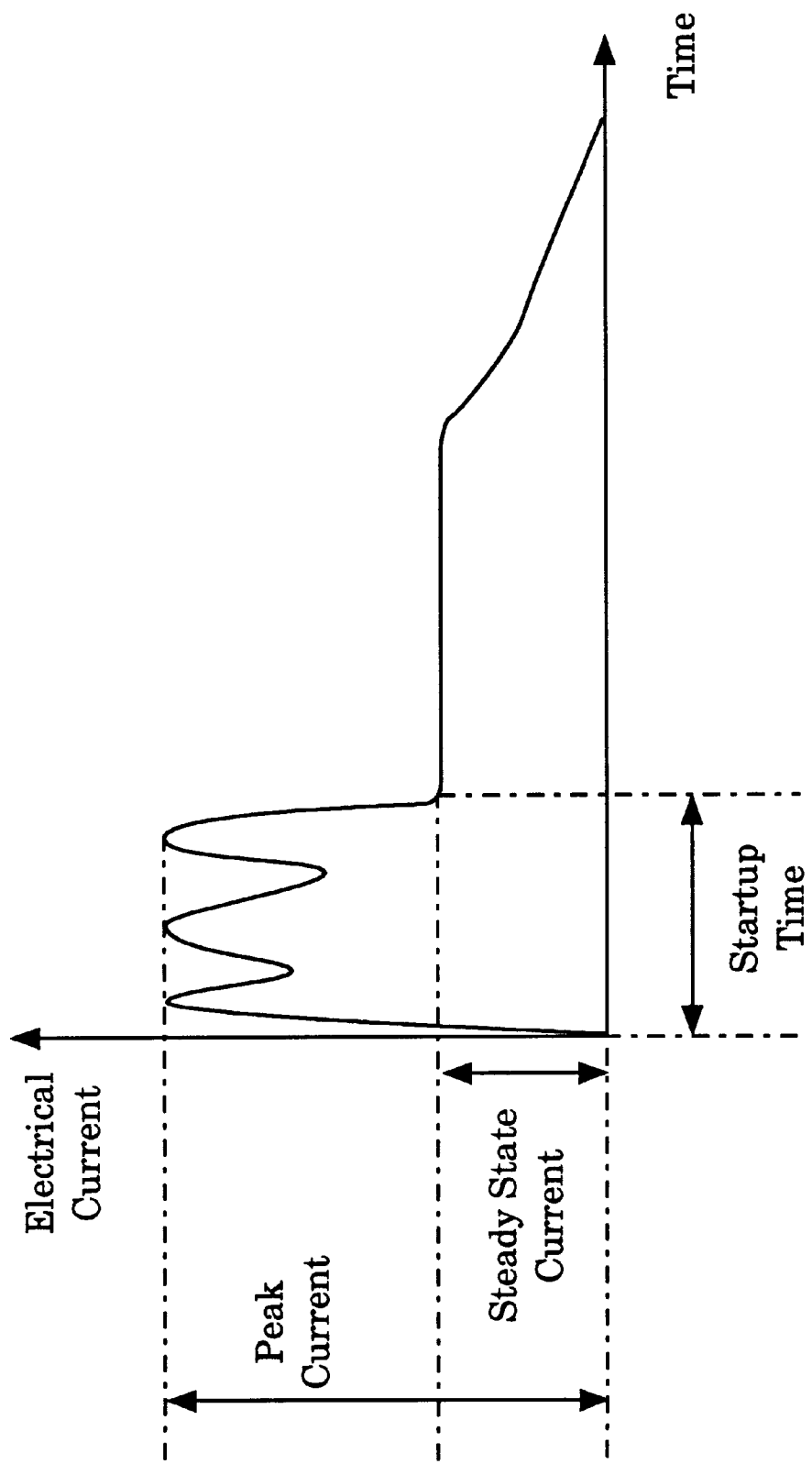
FIG. 7 illustrates a power characterization of a resident disk subsystem which shows the electrical current drawn by the resident disk subsystem as a function of time during the startup phase, the steady state phase, and the power off phase of operation.

FIG. 7 illustrates a power characterization of the resident disk subsystem 22 for one embodiment. The graph shown represents the electrical current drawn by the resident disk subsystem 22 as a function of time during the startup phase, the steady state phase, and the power off phase of operation.

The startup time and electrical current gradient shown occurs while the internal rotating magnetic media of the resident disk subsystem 22 spins up to the appropriate angular velocity during the startup phase. During the startup phase, the electrical current consumption for the resident disk subsystem 22 rises to a peak electrical current draw from the battery subsystem 12. Thereafter, the electrical current consumption of the resident disk subsystem 22 drops to a steady state current level during the steady state phase of normal operation.

The disk device driver 94 examines the profile of electrical current consumption by the resident disk subsystem 22 to determine the startup time as shown as well as the startup electrical current and the steady state electrical current required by the resident disk subsystem 22. The disk device driver 94 stores the startup time, the startup electrical current, and the steady state electrical current required by the resident disk subsystem 22 into the power characterization table 86. The disk device driver 94 subsequently uses the startup time, the startup electrical current, and the steady state electrical current values stored required in the power characterization table 86 to process power allocation requests from devices in the computer system 10.

Figure 8:
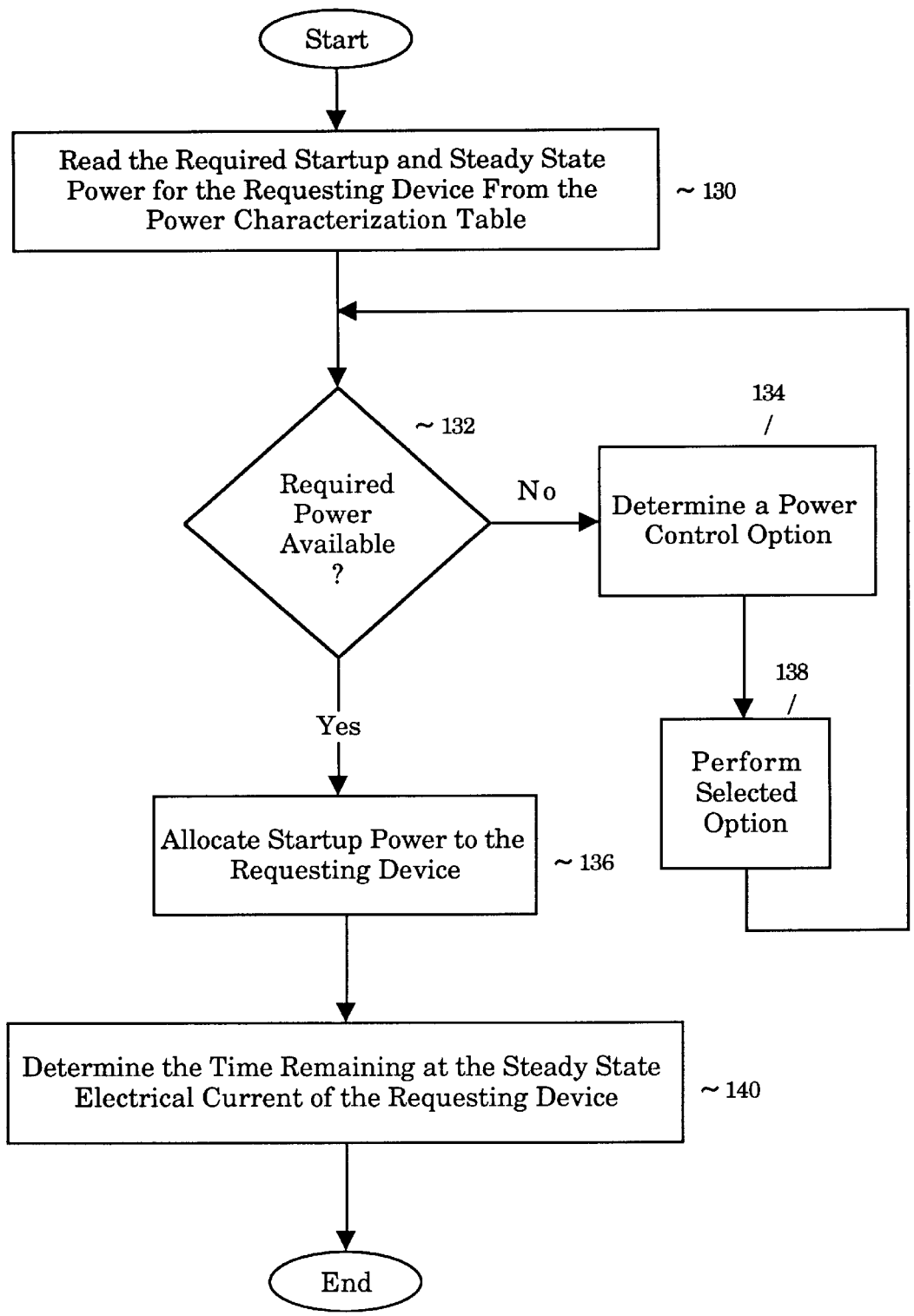
FIG. 8 illustrates the handling of a power allocation request from a requesting device driver by the power budgeter application for one embodiment.

FIG. 8 illustrates the handling of a power allocation request from a requesting device driver by the power budgeter application 84 for one embodiment. The requesting device drivers of the computer system 10 include the disk device driver 94, the communication device driver 96, and the device driver 98. Each requesting device driver transfer power allocation requests for corresponding requesting devices to the power budgeter application 84 through the power coordinator 90.

At block 130, the power budgeter application 84 begins processing a power allocation request by reading the required startup and steady state power for the requesting device from the power characterization table 86. Thereafter, at decision block 132 the power budgeter application 84 queries the battery subsystem 12 to determine whether the required power for the requesting device is available. For one embodiment, the power budgeter application 84 uses the at_rate_ok battery message to the microprocessor 34 to determine whether the required power for startup and other system functions is available from the battery subsystem 12.

If the required power for the requesting device is not available at decision block 132 then control proceeds to block 134. At block 134, the power budgeter application 84 determines a power control option for handling the lack of available power according to system power policy. For one embodiment, the power control options are user preselected default options for the system power management software. The user power control options may include, for example, load shedding functions such as switching one of the other devices of the computer system 10 into an off mode or a standby mode that reduces power consumption from the battery subsystem 12.

Thereafter at block 138, the power budgeter application 84 performs the selected user option. Control then proceeds back to decision block 132 to again determine whether the requested power allocation for the requesting device is available.

If the query of the battery subsystem 12 or power supply at decision block 132 indicates that the required power for the requesting device is available, then control proceeds to block 136. At block 136, the power budgeter application 84 allocates the startup power specified in the power characterization table 86 to the requested device.

After the startup time specified in the power characterization table 86 for the requesting device, the power budgeter application 84 determines the time remaining for the battery subsystem 12 at block 140. This step is not required in a non battery-based system. The power budgeter application 84 determines the time remaining at the steady state electrical current of the requesting device specified in the power characterization table 86 while taking into account the power consumption of the remainder of the computer system 10. For one embodiment, the power budgeter application 84 uses the at_rate_time_remaining battery message to the microprocessor 34 to determine the time remaining for the battery subsystem 12. Thereafter, the power budgeter application 84 optionally notifies the user of the remaining time available from the battery subsystem 12.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system comprising:
   a bus;
   a device coupled to said bus, said device operating on one of a plurality of operating phases; and
   a processing unit coupled to said bus, said processing unit executing a program that dynamically determines up-to-date device specific power consumption values for each of said plurality of operating phases, by determining a difference between an amount of power consumed by the computer system measured at a first point of time during active operation of the computer system while the device is in the computer system and switched on and an amount of power consumed by the computer system measured at a second point of time during said active operation of the computer system while the device in the computer system is switched off, said program further replacing old device specific power consumption values in a persistent storage with the up-to-date device specific consumption values for subsequent use by a power budgeting function in the computer system.

2. The computer system of claim 1, wherein the operating phases of the device include a startup phase that corresponds to a startup time between a low power phase of the device to a steady state phase of the device.

3. The computer system of claim 1, wherein the operating phases of the device include a steady state phase wherein the amount of power consumption by the device remains at a relatively constant level.

4. The computer system of claim 1, wherein the program measures the amount of power consumption by the computer system while the device is switched on and the amount of power consumption by the computer system while the device is switched off using a power meter coupled to a power supply of the computer system.

5. The computer system of claim 1, wherein the program places all other power consuming devices in the computer system in a steady power state.

6. The computer system of claim 1, wherein the program is a device driver program corresponding to the device.

7. A power management method in a computer system comprising the steps of:
   dynamically determining an up-to-date device specific power characterization across different operating phases of the device for at least one device in the computer system by measuring at various points of time during active operation of the computer system the power draw of the computer system while varying the operating phases of the one device; and
   replacing an old device specific power characterization across different operating phases of the one device in a persistent storage with the up-to-date device specific power characterization across different operating phases of the one device for subsequent use by a power budgeting function in the computer system.

8. The method of claim 7, wherein the device specific power characterization specifies an amount of power consumption by the device for said different operating phases.

9. The method of claim 8, wherein the operating phases of the device include a startup phase that corresponds to a startup time between a power off phase of the device to a steady state phase of the device.

10. The method of claim 8, wherein the operating phases of the device include a steady state phase wherein the amount of power consumption by the device remains at a relatively constant level.

11. The method of claim 7, wherein the step of determining a device specific power characterization comprises the step of determining a difference between an amount of power consumption by the computer system while the device is on and an amount of power consumption by the computer system while the device is off.

12. The method of claim 11, wherein the step of determining a difference between an amount of power consumption by the computer system comprises the step of measuring the amount of power consumption by the computer system using a power meter coupled to a power supply of the computer system.

13. The method of claim 11, wherein the step of determining a difference between an amount of power consumption by the computer system comprises the step of measuring the amount of power consumption by the computer system when said device is on and comparing the measured amount with the power consumption of said computer system when said device is off.

14. A power management apparatus in a computer system, comprising:

means for dynamically determining an up-to-date device specific power characterization across different operating phases of a device by measuring at various points of time during active operation of the computer system power draw of the computer system for at least two different operating phases of the device;

means for replacing an old device specific power characterization across different operating phases of the device in a persistent storage with the up-to-date device specific power characterization across different phases of the device; and means for storing the up-to-date device specific power characterization across the different operating phases of the device in the persistent storage for subsequent use by a power budgeting function in the computer system.

15. The apparatus of claim 14, wherein the device specific power characterization specifies an amount of power consumption by the device for each of said different operating phases.

16. The apparatus of claim 15, wherein the operating phases of the device include a startup phase that corresponds to a startup time between a power off phase of the device to a steady state phase of the device.

17. The apparatus of claim 15, wherein the operating phases of the device include a steady state phase wherein the amount of power consumption by the device remains at a relatively constant level.

18. The apparatus of claim 14, wherein the means for determining a device specific power characterization comprises means for determining a difference between an amount of power consumption by the computer system while the device is on and an amount of power consumption by the computer system while the device is off.

19. The apparatus of claim 18, wherein the means for determining a difference between an amount of power consumption by the computer system comprises a power meter coupled to a power supply of the computer system.

20. The apparatus of claim 14 further comprising means for monitoring the output of a battery connected to the computer system.

21. A computer system comprising:

a bus;

a power meter coupled to said bus for measuring power supplied to said bus;

a device coupled to said bus, said device operating in one of a plurality of operating phases each phase requiring different power; and a processing unit coupled to said bus, said processing unit executing a program that:

causes said power meter to measure at one point of time during active operation of the computer system the power supplied to said bus when said device is connected to said bus, but not drawing power from said bus;

causes said power meter to measure at other points of time during said active operation of the computer system the power consumed by said device supplied through said bus in at least a startup and a steady state phase;

determines up-to-date difference values between said power measured when said device is not drawing power from said bus and said power measured when said device is in said startup and said steady state phase; and replaces old difference values in a persistent memory with said up-to-date difference values for subsequent use by a power budgeting function in the computer system.

22. A method comprising the steps of:

causing all devices connected to a computer system bus and receiving power through said bus including a device to be measured to run in a steady state power consumption phase;

causing said device to be measured to go to an operating phase where it draws no power from said bus;

measuring the power supplied to said bus for all devices connected thereto when said device to be measured is in said operating phase where it draws no power from said bus;

measuring the power supplied to said bus for all devices connected to said bus when said device to be measured is drawing power from said bus in each phase in which said device to be measured operates within said computer system;

determining up-to-date difference values between said power supplied to said bus for all devices connected to said bus when said device to be measured is drawing power from said bus in each phase in which said device to be measured operates within said computer system and the power supplied to said bus for all devices connected thereto when said device to be measured is in said operating phase where it draws no power from said bus; and replacing old difference values in a persistent storage with said up-to-date difference values for subsequent use by a power budgeting function in the computer system.

* * * * *